UNITED STATES PATENT OFFICE.

JAMES A. MORRELL, OF NEW YORK, N. Y., ASSIGNOR TO HIMSELF, JAMES H. WHEATLEY, L. P. WILLIAMS, AND GEORGE H. BAXTER, OF SAME PLACE.

IMPROVEMENT IN HEATING AIR FOR USE IN THE ARTS.

Specification forming part of Letters Patent No. 142,497, dated September 2, 1873; application filed July 18, 1873.

*To all whom it may concern:*

Be it known that I, JAMES A. MORRELL, of the city, county, and State of New York, have invented an Improvement in the Art of Heating Air or other aeriform fluids, of which the following is a specification:

On the 12th day of September, A. D. 1871, I took out Letters Patent of the United States for an improved process of manufacturing, crystallizing, and refining sugars, in which I describe a process employing an apparatus consisting, in part, of an air pump or bellows, or other suitable device for accumulating and moving air, and a furnace or heater in which the air is to be heated in its transit from the pump to the evaporating-vessel, which air was proposed to be conveyed by means of a pipe or pipes, in which was to be arranged, in any suitable or preferred form, a combination of metals to form a battery, by means of which the air is impregnated or surcharged with electricity in passing over it. In operating this process I have found that the intermediate furnace, or heater for heating the air in its transit from the pump, is not necessary in practice, but that the air, in passing over the battery-coil, or plates of metals of different oxidizable properties, becomes heated so as to be brought to a temperature sufficiently high to make it applicable to heating houses or cars, for purposes of evaporation, and different practical uses.

To enable others skilled in the art to practice my invention, I will describe one form of apparatus by means of which it may be applied; but in this application I do not desire to be limited to any particular form of apparatus; such apparatus may be made the subject of future applications.

Any of the ordinary devices for obtaining a pressure-blast may be employed, by means of which air may be forced through pipes or chambers containing coils or plates of zinc and copper alternated. For this purpose, wires, plates, or pieces of any metals capable of use in the construction of a voltaic battery may be employed. The pipes or chambers containing such diverse metals may be connected with heaters of any approved construction, by means of which heated air may be utilized for warming buildings or railway-cars. It is, however, manifest that the heated air may also be used for any calorific purpose for which its temperature is suitable, and I do not, therefore, limit my claim to any special mode of utilizing the heat. It may be desirable for some purposes to heat the air to a higher degree than can be accomplished by the means aforesaid. This may, of course, be accomplished by any convenient superheating apparatus, through which the heated air may be passed. In my said former Letters Patent I have covered only one special use of a similar apparatus—viz., the electrizing of the air for the purpose of effecting the crystallization of sugars. At the time of making that application I was not aware of the calorific effect of the use of the apparatus, and my purpose in this application is to cover the process as a mode of heating air, and without regard either to special uses or to the electrical condition of the current of air, disclaiming any purpose to cover anything included within the scope of my said former patent as stated therein.

What I claim as my invention, as an improvement in the art of heating air for calorific uses, and desire to secure by Letters Patent, is—

Heating a current of air by forcing it through a pipe or closed chamber containing diverse metals, such as are capable of inducing voltaic action, substantially in the manner set forth.

In testimony whereof I have signed my name to this specification in the presence of two subscribing witnesses.

JAS. A. MORRELL.

Witnesses:
B. EDW. J. EILS,
R. MASON.